Figures 1, 2:
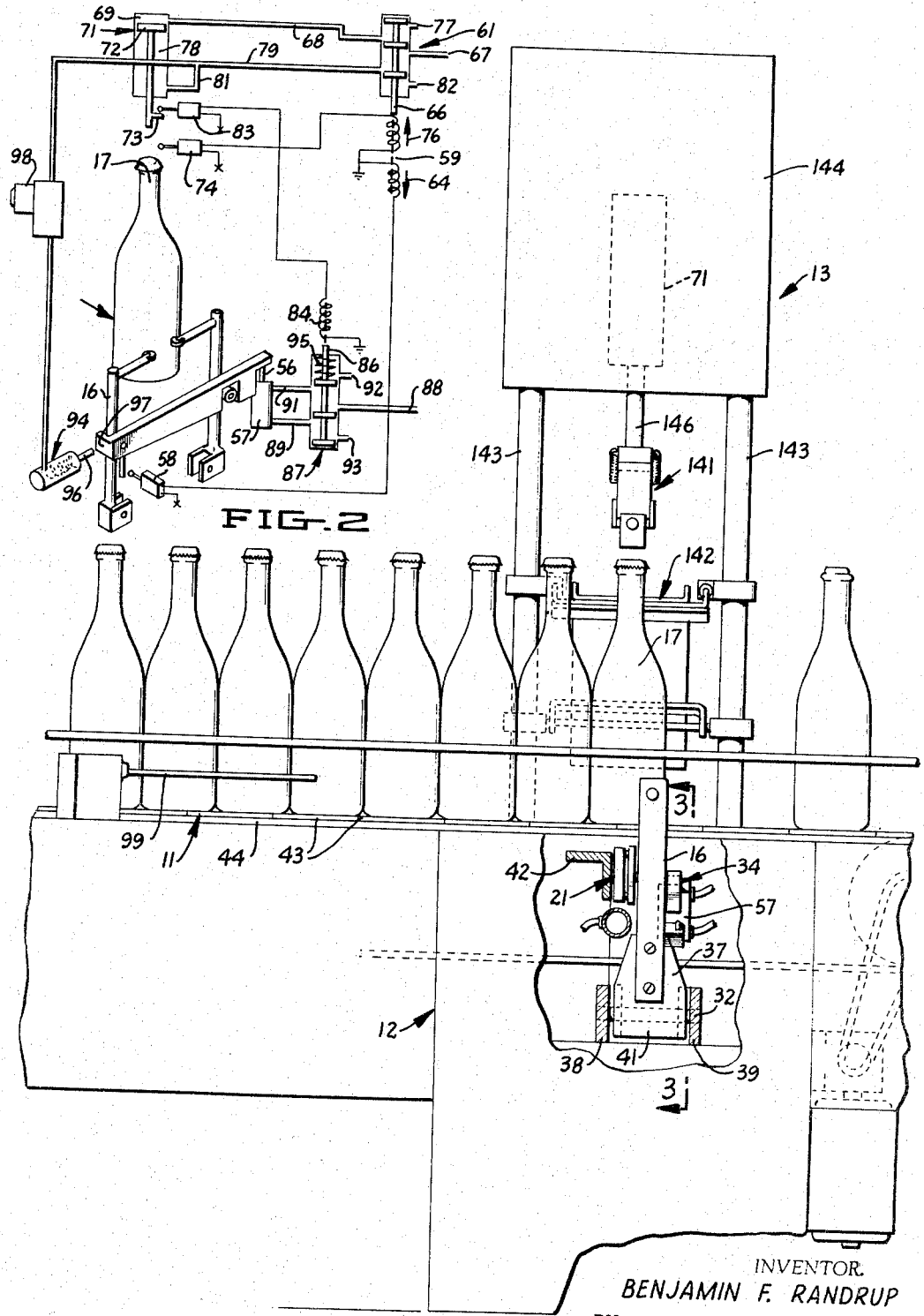

Dec. 5, 1967  B. F. RANDRUP  3,355,856
INDEXING DEVICE
Filed April 28, 1965  4 Sheets-Sheet 1

INVENTOR.
BENJAMIN F. RANDRUP
BY Schapp & Hatch
ATTORNEYS

Dec. 5, 1967  B. F. RANDRUP  3,355,856
INDEXING DEVICE
Filed April 28, 1965  4 Sheets-Sheet 2

INVENTOR.
BENJAMIN F. RANDRUP
BY
Schapp & Hatch
ATTORNEYS

INVENTOR.
BENJAMIN F. RANDRUP
BY
ATTORNEYS

Dec. 5, 1967  B. F. RANDRUP  3,355,856
INDEXING DEVICE
Filed April 28, 1965

4 Sheets-Sheet 4

INVENTOR.
BENJAMIN F. RANDRUP
BY Schapp & Hatch
ATTORNEYS

United States Patent Office 3,355,856
Patented Dec. 5, 1967

3,355,856
INDEXING DEVICE
Benjamin F. Randrup, 423 Roberta Ave.,
Pleasant Hill, Calif. 94523
Filed Apr. 28, 1965, Ser. No. 451,524
17 Claims. (Cl. 53—76)

The present invention relates to improvements in an indexing device operative in combination with a conveyor for providing a precise location of objects carried on said conveyor, and, more particularly, the invention relates to an indexing device for precisely positioning bottles and like containers and holding them in said precise position for a time sufficient to carry out other operations.

It is well known that in certain industries such as the wine industry various operations are carried out such as crowning, decrowning, labelling, stripping, corking, stamping and other operations, and it is desirable to effect these operations quickly and automatically while the bottles are moving on a conveyor. It is also well known that in order for certain of these operations to be carried out in the desired fashion, the bottles must be precisely positioned. This is particularly true where the operation involves decrowning and a decrowning machine such as the one described herein is utilized.

While certain methods of guiding containers on a conveyor are well known, such as having the containers move with their sides adjacent guides, such guides are insufficient to provide the necessary centering for certain operations such as decrowning. The reason for this inaccuracy involves the fact that these guides position from one side only and variations which naturally occur in diameters of bottles and other similar containers. In addition, where such guides are utilized, the positioning of the guide must be changed for different diameters and various sizes of containers cannot be handled in the same operation.

The present invention provides for an indexing mechanism which is capable of accurately positioning such containers as they move on a conveyor so that operations such as those mentioned above can be carried out. In particular, the invention provides such an indexing mechanism which is capable of holding the bottle in such an accurate position that a simple decrowner can remove the cap from the bottle in an absolutely reliable procedure.

Accordingly, it is a primary object of this invention to provide an indexing device capable of operating with a conveyor to precisely position bottles or like containers and retain them in the positioned location for a time sufficient to conduct an operation on the container and thence allow the container to continue on its way on the conveyor.

Another object of the invention is to provide an indexing device of the character described which is compact, contains a minimum of parts, and which is absolutely reliable in operation.

A further object of the invention is to provide an indexing device of the character described in association with a conveyor for moving bottles and the like and an automatic decrowner capable of removing crown-type bottle caps from the tops of bottles in a reliable and efficient manner.

A further object of the invention is to provide an indexing device of the character described which is not only capable of indexing the position of the bottles precisely but is also capable of adjusting the rotational position of the bottle so that the bottle is precisely oriented as to rotation as well as to lateral positioning.

Still another object of the invention is to provide an indexing device of the character described which is fully automatic and rapid in operation.

Further objects and advantages of my invention will be apparent as the specification progresses, and the new and useful features of my indexing device will be fully defined in the claims attached hereto.

In its broad aspect, the indexing device of this invention is designed to index containers having a horizontally disposed circular cross-section during movement of the container on a conveyor which comprises an indexing device for indexing containers and the like having surfaces presenting a horizontal circular cross-section during movement of the containers on a conveyor, comprising positioning means carrying a pair of opposed members adapted to abut the surface of the container in two lateral locations on the circular portion thereof whereby the container will be pushed into central alignment between said members, said members being mounted for lateral movement, yieldable means for urging said members relatively toward each other, said yieldable means being sufficiently yieldable to allow the members to be moved relatively apart on movement of a container into indexing position by said conveyor, centering means associated with said opposed members for maintaining the members in bilateral symmetry with respect to a central alignment during lateral movement of said members, latch means associated with said members for holding the members in an adjusted lateral location during positioning of the unit being positioned, and means for releasing said latch means and allowing said members to move laterally an amount sufficient to allow the container being indexed to pass through said indexing device.

The invention is characterized by incorporating an indexing system that operates on both sides of the container. In this way, variations in the diameter of the container do not cause inaccuracies in the indexing operation as is the case when indexing is achieved from one side only. The invention has been developed specifically for the indexing of bottles and it will be described fully for this type of container. However, it will be appreciated that any container which may be oriented and which has a symmetrical circular cross-section or equivalent may be indexed by the device made according to the invention.

Accordingly, it is contemplated that cans, pie plate containers, and many other types of container may be indexed by the apparatus of this invention. Such indexing may be used in the application of tops, lids, labels or any other operation where accurate indexing is necessary or desirable.

It should be understood that the indexing device of the invention is adapted to be utilized with a conveyor which carries the containers in free movement thereon. In other words, the containers should be sitting on the conveyor and held in position by gravity and move along by frictional engagement between the conveyor and the base of the container. This frictional engagement should allow relative slippage so that the container may be held and retained in the indexed position while the conveyor is still moving. However, it will be appreciated that the conveyor may also be stopped during indexing, if desired.

It should also be understood that the indexing conveyor will usually be utilized in combination with some other means for carrying out an operation on the bottle or container being indexed. In this way, the precise positioning of the indexing device may be utilized to full advantage.

Figure 9:
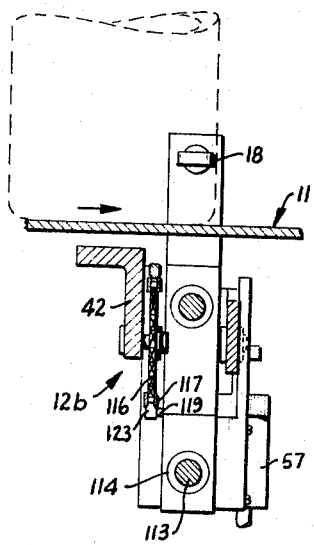
Figure 8:
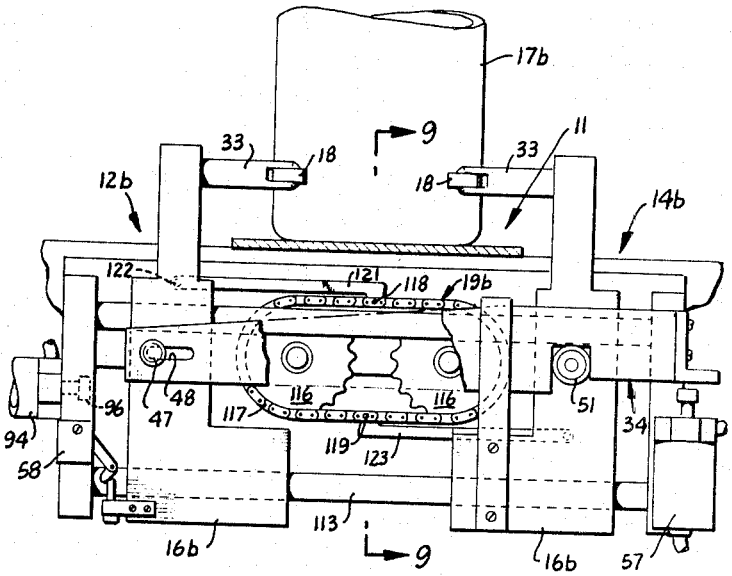
Figure 10:
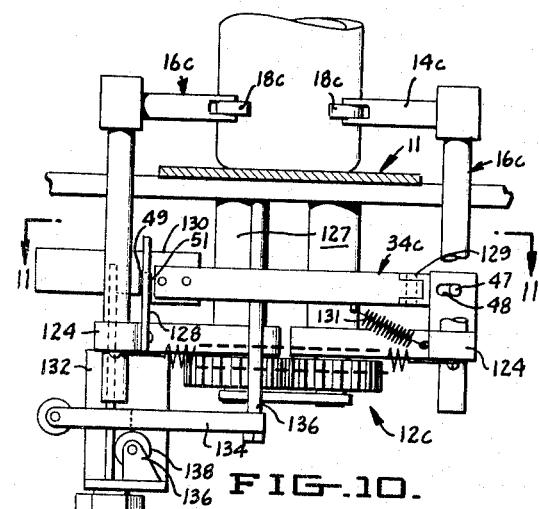
Figure 11:
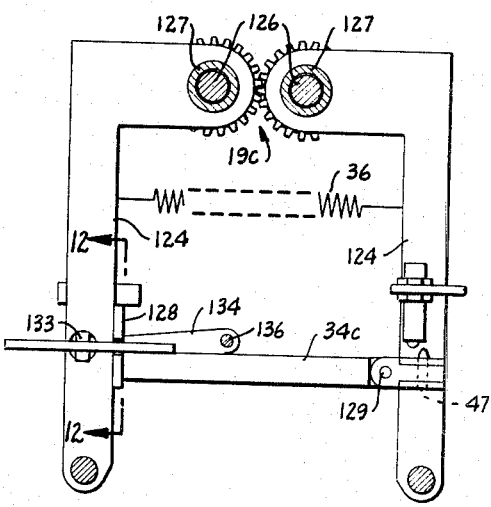
Figure 12:
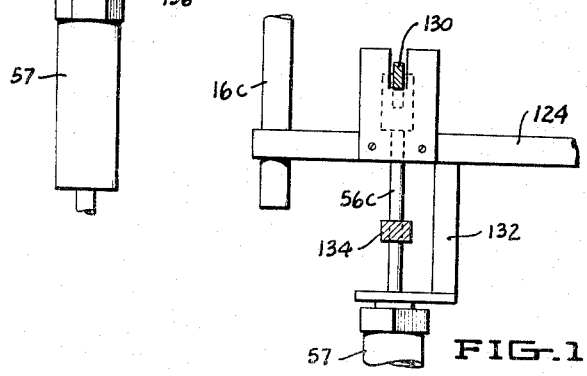
Figure 13:
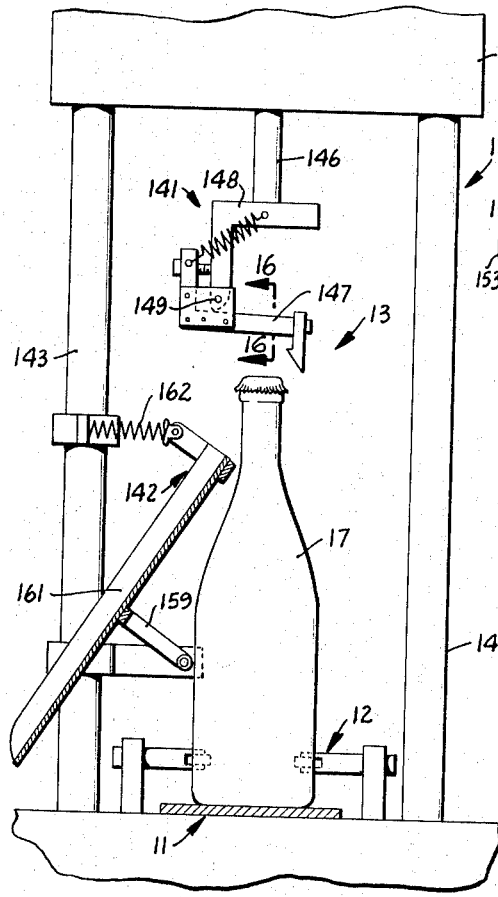
Figures 14, 15:
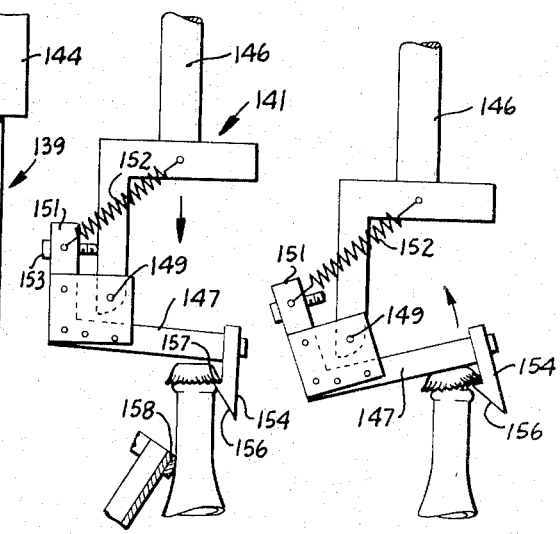
Figure 16:
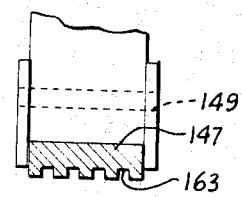
Figure 17:
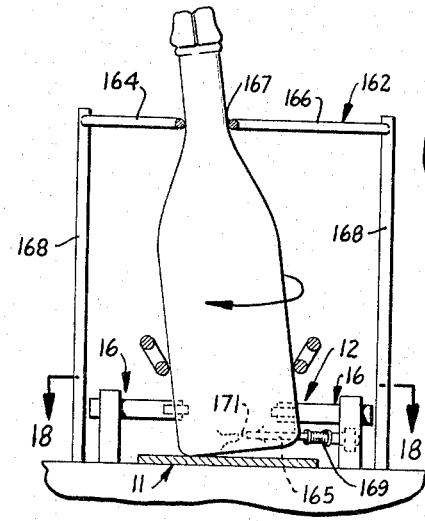
Figure 18:
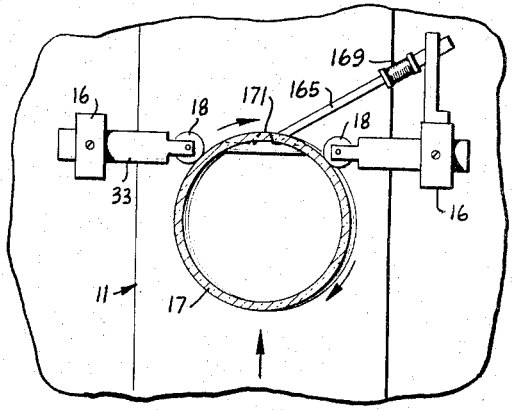

The preferred forms of my invention are illustrated in the accompanying drawings forming a part of this specification, in which:

FIGURE 1 is an elevational view illustrating the indexing device of the invention in position on a typical conveyor, and including a decrowning mechanism operatively associated therewith;

FIGURE 2, a diagrammatic view illustrating a typical automatic control system that may be utilized for synchronizing the operation of the decrowning mechanism with the indexing operation in the device of FIGURE 1;

FIGURE 3, a cross-sectional view illustrating the indexing device of FIGURE 1 as seen substantially in the plane of line 3—3 thereof and illustrating the manner in which the indexing device holds a bottle or similar container in accurate position;

FIGURE 4, a plan view of the indexing device as seen substantially in plane of line 4—4 of FIGURE 3;

FIGURE 5, a view similar to FIGURE 3 but illustrating how the indexing device is released after indexing and decrowning is completed to allow the bottle to move on the conveyor toward the next station of operation;

FIGURE 6, an elevational view of a modified form of the indexing device and the decrowner shown in FIGURES 1 through 5 in which two bottles are indexed and decrowned simultaneously;

FIGURE 7, a plan view of the modified device illustrated in FIGURE 6;

FIGURE 8, an end elevational view of a modified form of the indexing device (with parts being broken away to illustrate internal structures) illustrating an indexing device designed to handle especially wide containers and to be capable of operating over a rather wide range of width for containers;

FIGURE 9, a sectional view of the indexing device shown in FIGURE 8 taken substantially in the plane of line 9—9 thereof;

FIGURE 10, an elevational view of still another form of indexing device utilizing the principles of this invention;

FIGURE 11, a plan view of the device shown in FIGURE 10 as seen substantially in the plane of line 11—11 thereof;

FIGURE 12, an enlarged view of a portion of the device shown in FIGURE 11 as seen substantially in the plane of line 12—12 thereof;

FIGURE 13, an end elevational view of the decrowner illustrated in FIGURE 1 and designed to operate in conjunction with the indexing device of this invention;

FIGURE 14, an enlarged fragmentary view of the portion of the decrowner shown in FIGURE 13 as it appears in a later stage of operation and illustrating the operation of the moving parts;

FIGURE 15, a view similar to FIGURE 14 but illustrating a still further positioning of the device as it appears later in the decrowning operation;

FIGURE 16, an enlarged cross-sectional view of an arm of the decrowner shown herein illustrating a special construction and taken substantially in the line 16—16 of FIGURE 13;

FIGURE 17, an elevational view illustrating a spotting device for rotating the bottles about their vertical axes to spot the bottle and obtain a rotational indexing in addition to the indexing already described; and FIGURE 18, a plan view of the spotting device illustrated in FIGURE 17.

While I have shown only the preferred forms of my invention, it should be understood that various changes or modifications may be made within the scope of the claims attached hereto without departing from the spirit of the invention.

Referring to the drawing in greater detail, there is shown in FIGURE 1 a conveyor 11 with an indexing device 12 located in association therewith. The indexing device 12, as here shown, is synchronized with a decrowner 13 which operates in cooperation with the indexing device 12 to remove crown-type caps from the bottles here shown.

The indexing device 12 generally comprises positioning means 14 carrying a pair of opposed members or arms 16 adapted to abut the cylindrical surface of a bottle 17 or like container through wheels 18 or equivalent low-friction contacting members. The arms are carried for lateral movement across the conveyor so that they can assume an indexing position and then move out of the way to allow the container 17 to pass. After passage, the arms 16 are moved back into position and these movements are provided by yieldable means such as spring 36 for urging the members relatively together, acting in combination with the tendency of the containers to move the arms apart by virtue of their movement on the conveyor.

An important feature of this invention is to provide centering means 19 to maintain the arms 16 and contacting wheels 18 in bilateral symmetry with respect to a central alignment. In other words, both arms are positively maintained at equal distances from the center line. In the embodiment shown in FIGURES 1 through 5, this centering means is in the form of a linkage 21 containing three members 22, 23 and 24 joined together at their extremities 26 and 27 by pivotal attachment means, with member 23 in the middle and pivotally attached at the ends thereof through pivotal attachments 28 and 29 to each of the arms 16. The linkage 21 is also pivoted at 31 to a frame of the device through frame member 42 so that the lateral movement of arms 16 is tied together and each arm has to move the same distance with respect to the central axis of the conveyor.

As here shown, each arm 16 is pivoted at 32 at the lower extremity thereof so that the arms may swing outward, and each arm is formed with a substantially perpendicular extension 33 on which the wheels 18 are carried. However, it will be appreciated that various changes in the shapes of the parts would be operative and the illustrations in the drawings show examples of good operative designs.

As indicated above, the arms are carefully controlled in their positioning and moved by controlled positioning means. It will be appreciated that various types of positioning means could be provided to precisely position the arms at desired time sequences, but I prefer to utilize springs and mechanical stops insofar as possible. In this way, the only motive powered means in the indexing device of the embodiment of FIGURES 1 through 5 is that which is used to operate a latch means 34. This latch means is used to hold the arms in precise position, acting in combination with a spring 36 biased to bring the arms close together.

It is important that the parts be carried in a low friction relation and that the tension of the spring be adjusted so that it will tend to bring the members back close together, but will yield when a bottle 17 or like container strikes the contacting surfaces of the members or arms 16. In order to provide a good low friction construction, I prefer to construct the pivot at 32 into a widened extension 37 of arm 16 and have the extension 37 carrying a low friction bearing therein.

Stability is obtained by having the bearings extend between frame members 38 and 39, as shown in FIGURE 1. With this construction, arm 16 is not only free to pivot rather easily, but it is also held against lateral thrust by the low friction bearing surface. Of course, the linkage 21 also tends to hold these arms against lateral thrust, and its pivots should also be low friction. However, it is believed to be better to have the lateral thrust taken up in the main bearing 41 providing pivot 32. As here shown, the linkage is accurately held in centered position by having its central pivot 31 attached to a frame member 42, and all of these frame members are adapted to fit under the conveyor.

The conveyor itself may be any suitable belt-type conveyor which will carry bottles by frictional engagement on the bottoms thereof, but which will slip past the bottles if the bottles are held. As here shown, the conveyor is a typical conveyor used in the industry, which comprises a group of elongated rectangular plates 43 pivotally connected to each other at the sides thereof and supported on suitable skids or the like 44. With this construction, or similar construction, the bottles are carried by a continuously moving flat surface and the bottles are carried with sufficient force that they will tend to move the arms 16 outwardly against the tension in spring 36. However, when no bottle is pushing on the support 16, the spring 36 will return it to its closest-together position and the spring should be strong enough to make this action rather rapid. In this connection, it might be noted that the members 16 are constructed with rather small moments of inertia so that quick movements may be achieved with a minimum of parts.

In some cases, a single bottle or container will not cause the arms to open against the spring, but in such cases, the device is operated with a plurality of bottles or containers in contacting relation in a line. In this way, several bottles or containers combine their forces and open the arms to let the forward bottle through. However, it will be appreciated that during indexing, the latch means will hold back a large number of bottles and cause relative slippage between the bottles and the conveyor.

As shown in the embodiment of FIGURES 1 through 5, the latch means 34 comprises an elongated latch 46 carried for pivotal and sliding movement on one of the arms 16 by means of a pin or lug 47 which is carried on the arm 16 and fits through an axially-extending slot 48 on latch 46. The latch also comprises a catch 49 defined by an elongated cut-away portion 51 and having a wall 52 adapted to abut a pin or lug 53. As shown in FIGURES 3 and 5, this pin 53 is carried on the other arm 16 and is constructed in the form of a wheel so as to provide quick and easy opening of the latch. The latch also contains a flat bearing surface 54 at an end thereof which is pushed upwardly by a plunger 56 carried within an air cylinder 57.

It is an important feature of this invention that slot 48 and cut-away 51 are elongated to allow the pin to slide somewhat relatively apart before the latch is opened. This allows some movement of the members 16 while the bottle is pushing the latches open and provides better centering of the bottle.

Thus, FIGURE 3 shows the positions of the arms 16 in phantom before a bottle comes into contact and here the pins bear against the inner ends of the slot and cut-away portion due to the action of the spring 36. When the conveyor brings a bottle against the arms 16, the curved forward surface of the bottle tends to push the arms laterally apart, as best illustrated in FIGURE 4. The arms then assume the position shown in solid in FIGURE 3 because the latch prevents further lateral movement of the arms. In this position, the bottle will be centered with respect to the axis of the conveyor and in proper alignment for the de-crowning or any other operation, where accurate alignment is important. It should be noted that this alignment is accurate and not affected by variations in diameter size of the bottle. Thus, it is also suitable for decrowning bottles of different diameters during the same run. Although variation in the diameter of the bottle affects the longitudinal position to some extent, this variation may be compensated for by using a wide enough ejector hook or barb on decrowner 13.

The decrowning or other operations should take place when the bottle has been positioned by the indexing apparatus and is in this indexed position. Accordingly, the operation of the decrowner or like apparatus should be synchronized with the action of the indexing mechanism so that these operations are properly synchronized.

In general, this may be accomplished by any means known in the art, such as by the use of limit switches, timers, or any known control system for achieving the purpose. As shown in FIGURE 2, a typical control system is shown in which limit switches are utilized for controlling valves in fluid lines and fluid motive power means are utilized for actuating the latch and the decrowner at the desired times.

Thus, in the embodiment of FIGURES 1 through 5, the indexing mechanism is operated by the movement of the bottle against the arms 16 to take up the play in latch mechanism, so that indexing is achieved with the latch being closed. When the latch reaches this indexed position, the switch 58 is actuated to operate a double position relay 59 which in turn operates a switching valve 61. The switch 58 may be any suitable switch capable of registering when the arms have been pushed outward as shown in FIGURE 3 and the bottle is indexed, and may be a microswitch or magnetically operated limit switch, or any other kind of suitable switch placed for operation as the latch moves into indexing position.

As here shown, the switch is a one-way toggle switch operative through toggle members 62 which are pivotally attached at 63 to one of the arms 16. Thus, as the arm 16 moves from the position shown in phantom in FIGURE 3 to the position shown in solid, the switch makes a contact which is of sufficient duration to cause relay 59 to pull the valve stem 66 of valve 61 downwardly as indicated by arrow 64. When the valve assumes this position, air or other fluid under pressure goes from inlet line 67 through valve 51 to line 68 and then to chamber 69 of air cylinder 71, thereby causing piston 72 to move downward. This downward movement of piston 72 is utilized to provide downward movement of the decrowner and the operation of this mechanism will be fully explained hereinafter.

Referring again to FIGURE 2, it is seen that as the piston 72 moves downwardly, it has an actuating element 73 operating limit switch 74 which operates solenoid 59 in the direction indicated by arrow 76 to return the switching valve 61 to the upward position. This will take the air pressure out from chamber 71 above the piston because this chamber will now be in communication with exhaust port 77. At the same time, air pressure will be provided in chamber 78 below the piston from supply inlet 67 through line 79 and branch line 81. The exhaust port 82, which was operative to allow downward movement of piston 72, is now closed off, as shown in FIGURE 2.

Thus, it is seen that the air cylinder operates to push the decrowner downward, and immediately upon reaching a downward location, the decrowner is brought back upward by fluid power. In this way, the system assures that the decrowner will make a full stroke and yet operate rapidly.

When actuating element 73 returns, it operates limit switch 83, which serves to energize solenoid 84. In this way, slide valve stem 86 is caused to move upward in valve 87 so that air or other fluid pressure from inlet line 88 will pass through the valve and through line 89 to operate air cylinder 57 and force piston 56 upward, the exhaust air from air cylinder 57 passing through line 91 and exhaust port 92. This operation of air cylinder 57 releases the latch and allows the bottle to pass on through the indexing machine. It should be noted that by the time the actuating element 73 reaches limit switch 83, the decrowning operation is completed.

On the upward return of the decrowning piston, actuating element 73 no longer operates limit switch 83, which in turn shuts off solenoid 84. The slide valve stem 86 is then spring-returned to the downward position as shown by spring 95. In this position, air enters line 88, goes through line 91, and operates air cylinder 57 to move piston 56 downward, the air exhausting from cylinder 57 through line 89 and exhaust port 93. This resets air cylinder 57 so that the latch can drop back into position when spring-returned after the bottle is cleared.

Although a particular operative control system has been illustrated in FIGURE 2, it will be appreciated that various modifications may be made and that the important thing is to synchronize the activities together so as to provide a rather simple operation which is reliable and yet rapid. It is also considered desirable that the machine be stopped at certain positions when the machine is turned off, so that it may turn on again and resume operation without any difficulty. In this connection, it is desirable to provide a system of stopping the machine where the bottle is retained in the indexing station. At this point, none of the controls operate in the cycle and when the machine is turned on, the cycle will continue as though it had never been interrupted.

In order to achieve this, stopping is effected by preventing the arms 16 from opening wide enough to permit the bottle to pass through, yet after the latch has been opened far enough so that the bottle will begin its journey through the cams and prevent the spring from closing them again. In this way, no new control cycle is initiated by switch 58. In order to achieve this function, I have provided in the machine here shown a stop 94 containing an air-actuated plunger 96 which abuts against arm 16 at 97 and prevents full opening thereof. This stop is operated from air line 79 by manual operation through button 98 or by automatic operation through gate switch 99 (see FIGURE 1).

In either event, air from line 79 is only available to go to the stop mechanism 94 when air is in line 79 or when the decrowning mechanism is on the return stroke. The cycle of operation is rather rapid, so that manual holding of the button will very quickly produce a result. In addition, this button could be thrown into suitable holding devices if desired. The machine is also provided with the gate switch 99, which will swing back across the conveyor by a spring (not shown) and trip the switch when there are no bottles in front of it. In this way, when the decrowner is not fed with bottles, it will automatically turn off, but when it next reaches the desired position. Thus, when the device is turned off either through the manual switch 98 or gate switch 99, air from line 79 operates stop 94 to prevent the gate from opening fully. At this time, the latch opener returns and the air cylinder returns to the upper position, but there is no new cycle started by switch 58 and the arms 16 stay open by virtue of the bottle remaining in a held position.

It will be noted that gate switch 99 is here shown at a position sufficiently in advance of the indexing mechanism to shut it off when the supply of bottles is reduced to four. In this way, a sufficient supply of bottles is maintained in front of the latch to assure opening against the spring. In some cases, one bottle will open the latch, but in others two or more will be required. If desired, the switch 99 may be adjustably mounted to provide variations in programming.

When it is desired to restart the machine, it is only necessary to operate a start button at 98 manually to close off the air line and bleed the air so as to allow the stop to open. In the event switch 99 has caused stoppage, additional bottles reaching switch 99 may be used to return the switch so as to close off the line and allow bleeding of the cylinder, as mentioned above. In other words, the stop control at 98 need only utilize a simple solenoid system with an air switching valve operative to supply or cut off air to the stop means 94.

From the foregoing description, it is seen that I have provided an accurate indexing mechanism capable of precisely positioning bottles so that operations such as decrowning may be effected. It will be appreciated that precise positioning is necessary in order to utilize certain pieces of apparatus such as the decrowner disclosed herein and that this indexing mechanism is capable of accurately centering containers of considerable variation in diameter. In addition, it will be appreciated that various modifications may be made to provide handling under special circumstances and to speed up the operation of the machine.

In FIGURES 6 and 7, there is shown a modification whereby two bottles may be indexed and decrowned simultaneously. It will be appreciated from this example that three or four bottles could be indexed by incorporating the same principles, if desired.

Thus, as shown in FIGURES 6 and 7, the conveyor 11 is equipped with an indexing device 12a which contains all of the parts described for indexing device 12 shown in FIGURES 1 through 5 and also includes a holding means 101, and multiplier members 102. The conveyor and indexing device is also equipped with a decrowner 13a which is similar to the decrowner 13 shown in FIGURES 1 and 13 through 16, except that the decrowner 13a is equipped with a multiple cap decrowner 103, which is also similar to decrowner 13 except that it contains only two or more opener head assemblies depending upon the number of containers to be handled in each group. Thus, as shown in FIGURE 6, there are two cap removers and the device is equipped to handle groups of two bottles. However, simple conversion to handling three or four bottles may be provided by simply multiplying the elements in the same manner illustrated in FIGURES 6 and 7, by increasing the width of decrowner 13, or by equivalent means.

Thus, in the embodiment shown, the positioning means 14 contains the opposed members 16 and other material described in FIGURES 1 through 5, and also contains multiple members 102 which are added as shown. The multiple members 102 comprise indexing contact elements 104 which include an arm 106 and low friction contact 107 added to member 16 in advance of the bottles to be indexed. These members are added in adjustable fashion so that the second bottle is indexed behind the leading bottle in a manner similar to that indexing the leading bottle. The multiple members 102 also contain holding guides 108 which are constructed to hold the positioning means 14a in open relation until the last bottle passes through the lead indexing members 16. In this way, the latch is held open until the second or last bottle clears.

In order to prevent more bottles than those being indexed from passing though the indexing unit, and in order to break away the bottles coming to the indexing station from the groups being indexed, the holding device 101 is provided with a retractable stop member 109 which is carried in air cylinder 111 and positioned in the stop position or in an out-of-the-way position according to synchronized signals. As here shown, signals are provided to put the holding device into holding position and to retract it on positive switch means automatically operating with the indexing device. However, it will be appreciated that this holding means could operate with a single switch together with timed delay means for completing the cycle at a timed duration later which will be sufficient for the purpose. Other control systems will become apparent from the description given herein and the invention should not be limited to any particular control system.

For example, the air cylinder 111 is moved into the forward or stop position when switch 58 is actuated while the bottles become indexed, or as they push the opposed members into the hold position of the latch. This may be achieved simply by wiring in a solenoid similar to that shown in FIGURE 2 for operating a valve to air cylinder 111 in the same manner that solenoid 59 and valve 61 operate for controlling air cylinder 69. Accordingly, it is believed that such circuitry need not be repeated.

In connection with the opening of air cylinder 111, this should be done after the indexed bottles clear the indexing device. As here shown, a micro-switch 112 is used for causing this movement with the micro-switch 112 operating when the lead bottle strikes the switch. In this way, the conveyor will clear both bottles in sufficient time before the lead bottle of the next group gets into position, yet the lead bottle will move beyond the first gate. This micro-switch 112 can be movable in order to adjust its position for utilizing multiple groups other than two. Other parts may also be replaced and the apparatus is easily modified to handle two or more bottles or similar containers, if desired.

As indicated above, the opposed members or arms 16 should be mounted for lateral movement and in the embodiment shown in FIGURES 1 through 5, this lateral movement is obtained by pivoting the arms around horizontal axes. However, it will be appreciated that this movement may be provided by utilizing vertical pivots on the arms which in turn are horizontal and connected to the vertical upright portions of the arms so that vertical pivoting can also provide the same general opposed movement.

It should also be realized that in addition to this opposed movement, centering means must be associated therewith for maintaining the movement of each member in bilateral symmetry with respect to a central alignment. In other words, the movement of one member must be opposed by the same movement in the opposite direction by the other member so that both members remain at a similar distance from the center. In the embodiment of FIGURES 1 through 5, the centering means was in the form of a rather simple linkage which is especially suitable for the pivotal mounting provided for the members. However, it will be appreciated that other centering means may be utilized and might be preferred where other types of mounting of the members are provided.

Thus in FIGURES 8 and 9, an embodiment is shown in which the movement of the opposed members is along a common shaft so that simple translation is provided without any rocking motion or pivoting of the members mounted for lateral movement. In addition, another suitable centering means is provided which is especially adapted to provide centering where a rather large range of movement is to be accommodated. Accordingly the embodiment of FIGURES 9 and 10 is especially good where large lateral movements or large containers are to be handled. In fact, it is believed that such an indexing device would be suitable for indexing barrels or drums.

Referring again to FIGURES 8 and 9, there is shown an indexing device 12b mounted with respect to conveyor 11 for indexing containers 17b or the like. The device 12b comprises positioning means 14b carrying a pair of opposed members 16b on a common shaft 113, with the shaft 113 being held in rigid position by the frame of the device. Thus the members 16b are journaled with suitable bearings 114 so that they are free to slide axially toward and away from the center line of the conveyor. The members 116b are constructed otherwise similar to the members 16 and contain extensions 33 which in turn carry wheels 18 to provide a low friction contact.

The members are also urged together by means of a spring 36 which is biased to bring the members close together and which is opposed by the camming action of the bottle or similar containers attempting to push between the contacting members 18 in a manner similar to that described in connection with the embodiment of FIGURE 1 through 5. A latch means 34 is provided which is also similar to that provided in the embodiment of FIGURES 1 through 5 except that only the elongated slot is shown and there is no excess in the cut-away 51 of the latch Otherwise the latch is constructed exactly the same, and it operates in a similar fashion being actuated by air cylinder 57 and equipped with the shut-off stop means 94 and 96 and other suitable controls including switch 58 all as described in the embodiment of FIGURES 1 through 5.

However, the centering means is different and in place of the linkage type centering means 19, a centering means 19b is provided which consists of a pair of sprockets 116 carrying a chain 117 with the sprockets being mounted on a frame member 42 so as to provide length of chain on each side of the sprocket. With this construction, opposed links 118 and 119 will move in opposite directions but at the same controlled distance. In association with link 118, there is provided an arm 121 which is attached to the member 16b at 122 and held to link 118 as shown so that movement of arm 16b will be tied into movement of link 118 and rotation of the sprockets. Thus movement of link 118 will also be tied in with movement of link 119 which has an arm 123 connected thereto which arm is also connected to the other opposed member 16b. In this way, the opposed members are kept in the proper symmetrical relation. The functioning of the embodiment is similar to that described above and need not be repeated, except to mention that this embodiment is particularly valuable for handling heavy containers and providing large movements of the opposed members.

Another embodiment of the indexing device is shown in FIGURES 10 through 12, where the manner of mounting the opposed members and the specific centering means varies in another respect. This embodiment is also suitable where a large variation in size of containers may be desired to be accommodated so that rather large lateral movements of the arms may be achieved and yet the embodiment is good for use on small containers. In some cases, where the alteration is severe, it is contemplated that a substitute latch mechanism may be provided during set-up of the machine.

The embodiment of FIGURES 10 through 12 shows an indexing device 12c in operative position on a conveyor 11 and comprising positioning means 14c which include a pair of opposed members or arms 16c having contacting wheels 18c and being carried by a pair of horizontal members 124 which in turn are carried for vertical pivoting on upstanding rods 126 through bearings 127. In this way, the horizontal members 124 are free to pivot outwardly and carry the members 16c in lateral movement over the conveyor in a manner somewhat similar to that described in the above-mentioned embodiments. The indexing device also contains springs 36 which urge the horizontal members 124 and thus opposed members 16c relatively together in accordance with the principles already described.

The centering means 19c is in the form of spur-gear sections carried on the horizontal members 124 so that the rotation of the members is positively geared together and provides the same rotation for each member but in opposite directions in accordance with the desired movement.

The embodiment of FIGURES 10 through 12 also contains a latch means 34c which is operative between the movable members 16c by being pivoted on one member through pivot pin 47 with slot 48 to allow lateral adjustment during indexing, and is held on the other member through catch 49 which contains a cut-away 51 adapted to engage a latch plate 128 carried on the other member. The latch 34c is constructed slightly differently from the latch 34 in order to accommodate the relative rotation between the arms 16c and the latch itself as the arms swing outwardly. In order to do this, a pivot joint 129 is provided to allow pivoting along the vertical plane and this is achieved through a standard pin arrangement. The pivoting at the other end is accommodated by virtue of the dimensions of the cut-away portion or catch 51 on the thin latch extension 130 and the dimensions of latch plate 128 which accommodate some vertical pivot.

The latch 34c is also equipped with a spring 131 to urge the latch downward at all times and increase the downward force already provided by the gravity. In the other two embodiments described, gravity is sufficient to bring the latch downward when desired, but in this embodiment, it is preferred to provide the spring in addition to gravity in order to assure proper operation. However, it will be appreciated that in some cases the springs may be dispensed with, or alternatively such a spring could be provided in the other embodiments. In effect, it will be appreciated that these three embodiments are illustrative and that certain interchange of parts could be made without departing from the spirit of the invention.

The indexing device 14c is otherwise equipped in similar fashion to the device of FIGURES 1 through 5 and contains air cylinder 57 operative through similar controls for opening the latch at the desired time. However, air cylinder 57 is not permanently affixed to the frame but is carried on horizontal member 124 by depending L-shaped frame 132 as best seen in FIGURE 12. Switch 57 is equipped with a plunger 56c which is similar to the plunger 56 except that it contains a slotted upper end to assure constant engagement in the latch. In addition, plunger 56 passes through a bore or hole 133 in arm 124 and is thus held in guided relation therein.

Further guides may be provided, if desired, by utilizing the guide arm 134 shown in the drawings, with this guide arm being pivotally supported from the frame by post 136 and having an appropriate slot for plunger 56 to fit therethrough in sliding relation. On the end of arm 134 is a stop wheel 137 to limit the outward travel of arm 124, and on the depending L-frame 132, another stop wheel 138 is provided for limiting inward travel. Other auxiliary pieces of equipment may also be added if desired, provided they allow for the basic operations required in the invention.

From the foregoing descriptions, it is seen that I have shown three different ways of mounting the opposed members mounted for lateral movement which are cammed by movements of the bottle into indexing position, and it is also seen that I have provided three different types of centering means. It will be appreciated that other variations could be developed and these different species are illustrative of the various ways that the operation of the invention may be carried out.

It will be appreciated that the indexing device of this invention will generally be used in association with another piece of equipment, and that this other piece of equipment may perform any operation in which holding of the device in precise indexed position is required. Thus it is seen that the indexing device of this invention is associated with a conveyor in such a way that the conveyor can bring the container or the like into indexing position, allow the container to remain stationary at this position for a period of time long enough to conduct an operation on the container, and then allow the container to move on with the conveyor in the usual fashion.

In order to illustrate the operation of an auxiliary piece of equipment, the decrowning device 13 has been shown in FIGURE 1. The particular decrowning device shown is believed to also incorporate invention and this decrowning device is illustrated in greater detail in FIGURES 13 through 16.

Thus referring more particularly to FIGURES 1, 2 and 13 through 16, it is seen that there is provided a decrowning device 13 in association with the conveyor 11 equipped with an indexing device 12 for precisely positioning bottles 17 or the like which are to be decrowned. Generally speaking, the decrowner contains support means 139, opener head assembly 141, and directing means 142 for directing caps away from the conveyor. The support means may include any suitable frame mounted on or near the conveyor, and as here shown consists of upright posts 143 and a housing 144 carried thereon as best shown in FIGURES 1 and 13. The housing supports elements from a suitable control system such as that shown in FIGURE 2, together with providing a mounting for the opener head assembly which should depend therefrom and be capable of reciprocating movement.

This reciprocating movement is provided by the air cylinder 71 described in connection with the control system illustrated in FIGURE 2 which incorporated this particular decrowning device as a specific example. The opener head assembly itself is carried on a reciprocable rod 146 which is operated by air cylinder 71. As here shown, the opener head assembly contains a cap remover 147 pivotally mounted in an off-set position so that on downward movement of the rod 146, the capper will engage the top of the bottle and pivot with respect thereto. Referring more particularly to FIGURES 13 through 15, it is seen that in a typical machine, the rod 146 is centered with respect to the bottle and carried an L-frame 148 on the bottom thereof with the depending leg of the frame 148 providing a pivot point 149 on which cap remover 147 is pivoted in off-set position. The capper itself is built in an L-shape having a rear leg 151 carrying a spring 152 for yieldably urging the cap toward a substantially horizontal position. The exact stop position of the cap may be adjusted by set screw 153.

At the other end of the cap remover 147, a depending cap engagement member 154 is provided and this cap engagement member has an inclined surface 156 at the end thereof and a barb 157 for gripping the cap as shown. With this construction, the inclined surface 156 pushes the bottle cap laterally to one side and allows the cap engagement member to pass by the cap so that the barb will be placed in position under the edge of the cap. Then as the assembly continues its downward movement as indicated in FIGURE 15, the off-set of the pivot at 146 causes downward movement of one side of member 147 to provide a tilt as indicated in FIGURE 15. This tilting action pulls the cap off in much the same manner as caps are removed from bottles by hand operation. After this tilting is effected, the cap is pulled in loose position and on return of the opener head assembly, the hook will pull the cap from one side over toward the directing means 142.

An important feature of the invention is provision of yieldable cushioning means bearing against the neck of the bottle at the side opposite cap engagement member 154, and this means is carried on the directing means in the embodiment shown. Thus, it is seen that as the cap engagement member 154 moves downwardly as shown in FIGURE 14, the bottle will push and bear against the cushion 158 carried on the directing means 142. The directing means itself is mounted for pivotal movement by arms 159 and the directing means is in the form of chute 161. The upper end of chute 161 carries this cushion 158 and also contains a compression spring 162 holding the upper end of the chute in position but yieldable against the forces of the inclined surface 156 of cap engagement member 154. With this arrangement, the engagement of the barb is positively assured. In addition, it is found that chute 161 is in position to receive the cap and direct it away from the conveyor on return of the opener head assembly.

During operation of the decrowner described above, it was found that sometimes there was a tendency for the caps to stick to the lower surface of cap remover 147, particularly with wet caps in which a suction is built up between the caps and the member. However, it was found that this problem was solved by providing a ribbed lower surface 163 on that portion of cap remover 147 which comes in contact with the caps (see FIGURE 16). Exhaust air from cylinder 71 may be directed against the top of the cap on the bottle following the one being decapped in order to blow moisture off the caps, if desired. Thus, in operation of the cap remover, a bottle is pushed into position in the indexing device 12 and trips the switch supplying air to the decrowner. This causes the opener head assembly 141 to move downward from the position shown in FIGURE 13 through the positions shown in FIGURE 14 and then 15. At this time, the cap has been loosened from the bottle. The downward movement also trips a switch providing immediate upward movement so that no time lag is encountered in the design illustrated herein. Upon upward movement, the cap is pulled upwardly on one side and thereby slid over into the chute 161 which directs it away from the conveyor.

From the operation described, it is seen that centering with respect to the lateral direction on the conveyor is important for the decrowner herein shown. Accordingly, the indexing device shown herein which indexed from both sides of the container and centers containers of various diameters is especially suitable. In addition, it is possible to add auxiliary equipment to the indexing device of this invention in order to provide a spotting operation. In other words, it is possible to provide accurate positioning of the rotational lie of the bottle in addition to the accurate indexing on the conveyor mentioned above.

This adjustment of rotation is known in the art as "spotting" and the spotting apparatus of this invention contains means for providing a tilt on the bottle when it is in indexed position against the opposed members so that the tilt will impart a rotational force to the bottle. In addition to the means for tilting the bottle, a stop arm 165 is provided to engage the spotting lug whereby the rotational motion due to the tilting will be stopped at the desired rotational position.

A suitable apparatus for providing the spotting mentioned above is shown in FIGURES 17 and 18, which comprises the conveyor 11 equipped with an indexing device 12 in accordance with the invention and containing tilting means 163 and a stop arm 164 for providing the functions mentioned above.

As here shown, the tilting means comprises a pair of guide arms 164 and 166 defining a slot 167 therebetween. The guide arms are shaped so that entry of the neck of the bottle is assured and the slot is narrowed down to the close tilting configuration at the indexing station. In order to support the guide arms 164 and 166 in proper location, suitable posts 168 are provided from suitable positions on the frame of the conveyor. Alternatively, the guide arms 164 and 166 could be mounted on the movable members 16 of the indexing device 12 so as to move into and out of position in the desired synchronization of the movement of the bottle into the index position. Other means for tilting the bottle could be provided if desired, and certain tilting means have already been suggested in the spotting art, see my United States Patent 3,169,629.

The stop arm is mounted for pivotal movement and resiliently held against the leading surface of the bottle as best seen in FIGURE 18. As here shown, the stop arm 165 contains a spring 169 which normally urges the arm into a straight configuration which is shown but which is free to bend back out of the way when the indexing gate opens so that the bottle can move on through. As best seen in FIGURE 17, it is seen that the spotting lug 171 of the bottle is placed lower than the opposed members 16 to avoid any interference with the indexing achieved by these arms, and yet it is placed in proper registry for the guide arms 164.

Although we have shown a spring 169 as part of the guide arm, it will be appreciated that a spring could be used to urge the arm against the container with perhaps a limit stop provided and yet allow the arm to swing out of the way on a pivotal mount and thus allow the bottle to pass. Accordingly, the invention is not limited to any particular design of stop arm but rather to the over-all combination of the guide arm and tilting means when acting together with an indexing device as illustrated herein.

From the foregoing description, it is seen that I have provided an indexing device capable of providing accurate positioning of a bottle or other container. It will be appreciated that this indexing device was developed specifically for use in the wine industry in order to automate certain operations heretofore carried out by hand. However, it will also be apparent that the indexing device of this invention has general usage for indexing any type of container having a substantially circular horizontal cross-section while the container is carried on a horizontally moving conveyor by frictional drag between the container and moving conveyor. Thus, it is seen that I have provided an accurate indexing device which is comparatively simple in design, absolutely reliable in operation, and constructed with a minimum of parts.

I claim:

1. An indexing device for indexing containers and the like having surfaces presenting a horizontal circular cross-section during movement of the containers on a conveyor, comprising positioning means carrying a pair of opposed members adapted to abut the surface of the container in two lateral locations on the circular portion thereof whereby the container will be pushed into central alignment between said members, said opposed members being mounted for lateral movement, yieldable means for urging said members relatively toward each other, said yieldable means being sufficiently yieldable to allow the members to be moved relatively apart on movement of a container into indexing position by said conveyor, centering means associated with said opposed members for maintaining the members in bilateral symmetry with respect to a central alignment during lateral movement of said members, latch means associated with said members for holding the members in an adjusted lateral location during positioning of the unit being positioned, and means for releasing said latch means and allowing said members to move laterally an amount sufficient to allow the container being indexed to pass through said indexing device.

2. An indexing device for indexing containers and the like having surfaces presenting a horizontal circular cross-section during movement of the containers on a conveyor comprising positioning means carrying a pair of opposed members adapted to abut the surface of the container in two lateral locations on the circular portion thereof whereby the container will be pushed into central alignment between said members, said opposed members being mounted for lateral movement, spring means for urging said opposed members relatively toward each other, said spring means being sufficiently yieldable to allow the members to be moved relatively apart on movement of a container into indexing position by said conveyor, centering means associated with said opposed members for maintaining the members in bilateral symmetry with respect to a central alignment during lateral movement of said members, latch means associated with said members for holding the members in an adjusted lateral location during positioning of the unit being positioned, said latch means being pivotally mounted on said members at one end of the latch means through a pin mechanism and having a catch at the other end of the latch means engaging an engagement member on the other of said opposed members, said latch means also containing a slot mechanism for providing slight lateral movement of said members from the closest position provided by the spring means to the position held by the latch, and means for releasing said latch means and allowing said members to move laterally an amount sufficient to allow the container being indexed to pass through said indexing device.

3. The indexing device for indexing containers and the like defined in claim 2, in which stop means are provided for shutting off the device when it is at a position in the sequence of operation of the machine after the latch opens and before the opposed members move far enough apart to let a container through, and shut-off means for actuating the stop means.

4. The indexing device defined in claim 2, in which controlled lift means are provided for lifting the latch an amount sufficient to release the catch.

5. An indexing device for indexing containers and the like having surfaces presenting a horizontal circular cross-section during movement of the containers on a conveyor, comprising positioning means carrying a pair of opposed members adapted to abut the surface of the container in two lateral locations on the circular portion thereof whereby the container will be pushed into central alignment between said members, said opposed members being mounted for lateral movement, yieldable means for urging said members relatively toward each other, said yieldable means being sufficiently yieldable to allow the members to be moved relatively apart on movement of a container into indexing position by said conveyor, centering means associated with said opposed members for maintaining the members in bilateral symmetry with respect to a central alignment during lateral movement of said members, latch means associated with said members for holding the members in an adjusted lateral location during positioning of the unit being positioned, means for releasing said latch means and allowing said members to move laterally an amount sufficient to allow the container being indexed to pass through said indexing device, and an apparatus for performing an operation on the container while the container is in indexed position, the operation of said apparatus being synchronized in timed fashion with the indexing step of the indexing device so that the operation takes place during the time period that the container is indexed, and the container is released from indexing at a time after the other operation is completed.

6. An indexing device for indexing containers and the like having surfaces presenting a horizontal circular cross-section during movement of the containers on a conveyor, comprising positioning means carrying a pair of opposed members adapted to abut the surface of the container in two lateral locations on the circular portion thereof whereby the container will be pushed into central alignment between said members, said opposed members being pivotally mounted on the indexing device for pivotal movement in a substantially common vertical plane and having low friction contacting elements adapted to abut the container and the two lateral locations on the circular portion thereof, spring means for urging said opposed members relatively toward each other, said spring means being sufficiently yieldable to allow the members to be moved relatively apart on movement of a container into indexing position by said conveyor, latch means associated with said members for holding the members in an adjusted lateral location during positioning of the unit being positioned, said latch means being pivotally mounted on said members at one end of the latch means through a pin mechanism and having a catch at the other end of the latch means engaging an engagement member on the other of said opposed members, containing a slot mechanism for providing slight lateral movement of said members from the closest position provided by the spring means to the position held by the latch, centering means associated with said opposed members for maintaining the members in bilateral symmetry with respect to a central alignment during lateral movement of said members, and means for releasing said latch means and allowing said members to move laterally an amount sufficient to allow the container being indexed to pass through said indexing device.

7. An indexing device for indexing containers and the like having surfaces presenting a horizontal circular cross-section during movement of the containers on a conveyor, comprising positioning means carrying a pair of opposed members adapted to abut the surface of the container in two lateral locations on the circular portion thereof whereby the container will be pushed into central alignment between said members, said opposed members being mounted for lateral movement, spring means for urging said opposed members relatively toward each other, said spring means being sufficiently yieldable to allow the members to be moved relatively apart on movement of a container into indexing position by said conveyor, latch means associated with said members for holding the members in an adjusted lateral location during positioning of the unit being positioned, said latch means being pivotally mounted on said members at one end of the latch means through a pin mechanism and having a catch at the other end of the latch means engaging an engagement member on the other of said opposed members containing a slot mechanism for providing slight lateral movement of said members from the closest position provided by the spring means to the position held by the latch, centering means associated with said opposed members for maintaining the members in bilateral symmetry with respect to a central alignment during lateral movement of said members, said centering means being in the form of a linkage containing three arms, with the central arm of the assembly being pivoted to the frame at the center portion thereof, and each of the other two arms being pivotally connected at its end to one of the opposed members whereby lateral movement of one of said opposed members is positively followed by said other member insofar as distance of movement is concerned but with directions of movement being opposite, and means for releasing said latch means and allowing said members to move laterally an amount sufficient to allow the container being indexed to pass through said indexing device.

8. The indexing device defined in claim 7, in which the means for releasing the latch means includes a fluid cylinder operated by control means actuated by synchronization with an apparatus for performing an operation on the container while the container is in indexed position.

9. An indexing device for indexing containers and the like having surfaces presenting a horizontal circular cross-section during movement of the containers on a conveyor, comprising positioning means carrying a pair of opposed members adapted to abut the surface of the container in two lateral locations on the circular portion thereof whereby the container will be pushed into central alignment between said members, said opposed members being mounted for lateral movement, spring means for urging said opposed members relatively toward each other, said spring means being sufficiently yieldable to allow the members to be moved relatively apart on movement of a container into indexing position by said conveyor, latch means associated with said members for holding the members in an adjusted lateral location during positioning of the unit being positioned, said latch means being pivotally mounted on said members at one end of the latch means through a pin mechanism and having a catch at the other end of the latch means engaging an engagement member on the other of said opposed members containing a slot mechanism for providing slight lateral movement of said members from the closest position provided by the spring means to the position held by the latch, centering means associated with said opposed members for maintaining the members in bilateral symmetry with respect to a central alignment during lateral movement of said members, said centering means being in the form of a chain assembly carried on the frame by a pair of sprockets and presenting opposed links traveling in opposite directions on movement of the chain assembly whereby said opposite movement is retained in positively the same magnitude, said chain assembly including connecting arms in operative engagement with said links at one position thereof and connected to said opposed members at another position whereby movement of one of the opposed members is operatively dependent on motion of the other opposed member so that said movements will be of the same magnitude but in opposite directions, and means for releasing said latch means and allowing said members to move laterally an amount sufficient to allow the container being indexed to pass through said indexing device.

10. The indexing device defined in claim 9, in which the means for releasing the latch means includes a fluid cylinder operated by control means actuated by synchronization with an apparatus for performing an operation on the container while the container is in indexed position.

11. An indexing device for indexing containers and the like having surfaces presenting a horizontal circular cross-section during movement of the containers on a conveyor, comprising positioning means carrying a pair of opposed members adapted to abut the surface of the container in two lateral locations on the circular portion thereof whereby the container will be pushed into central alignment between said members, each of said opposed members having bearings therein for axial movement on a common axis whereby said members may be moved relatively toward and away from one another, spring means for urging said opposed members relatively toward each other, said spring means being sufficiently yieldable to allow the members to be moved relatively apart on movement of a container into indexing position by said conveyor, centering means associated with said opposed members for maintaining the members in bilateral symmetry with respect to a central alignment during lateral movement of said members, latch means associated with said members for holding the members in an adjusted lateral location during positioning of the unit being positioned, said latch means being pivotally mounted on said members at one end of the latch means through a pin mechanism and having a latch at the other end of the latch means engaging an engagement member on the other of said opposed members, said latch means also containing a slot mechanism for providing slight lateral movement of said members from the closest position provided by the spring means to the position held by the latch, and means for releasing said latch means and allowing said members to move laterally an amount sufficient to allow the container being indexed to pass through said indexing device.

12. An indexing device for indexing containers and the like having surfaces presenting a horizontal circular cross-section during movement of the containers on a conveyor, comprising positioning means carrying a pair of opposed members adapted to abut the surface of the container in two lateral locations on the circular portion thereof whereby the container will be pushed into central alignment between said members, each of said opposed members having a substantially vertical section extending from a position below the conveyor to a position above the conveyor at each side thereof, and an inwardly extending arm above the conveyor carrying a low friction contact adapted to abut the surface of the container, each of said opposed members also having a substantially horizontal pivot arm connected to each of said vertical members at the lower portion thereof with each of the horizontal pivot arms being carried on the frame by pivotal connections for rotation around a vertical axis, spring means for urging said opposed members relatively toward each other, said spring means being sufficiently yieldable to allow the members to be moved relatively apart on movement of a container into indexing position by said conveyor, centering means associated with said opposed members for maintaining the members in bilateral symmetry with respect to a central alignment during lateral movement of said members, latch means associated with said members for holding the members in an adjusted lateral location during positioning of the unit being positioned, said latch means being pivotally mounted on said members at one end of the latch means through a pin mechanism and having a catch at the other end of the latch means engaging an engagement member on the other of said opposed members, said latch means also containing a slot mechanism for providing slight lateral movement of said members from the closest position provided by the spring means to the position held by the latch, and means for releasing said latch means and allowing said members to move laterally an amount sufficient to allow the container being indexed to pass through said indexing device.

13. The indexing device for indexing containers and the like defined in claim 12, in which the centering means consists of a pair of gears associated with said horizontal pivot arms of the opposed members and meshed to provide similar but opposed rotative motion to each of said pivot arms.

14. The indexing device defined in claim 13, in which the means for releasing the latch means includes a fluid cylinder operated by control means actuated by synchronization with an apparatus for performing an operation on the container while the container is in indexed position.

15. An indexing device for indexing groups of containers and the like where the containers have surfaces presenting a horizontal circular cross-section during movement of the containers on a conveyor, comprising positioning means carrying a pair of opposed members adapted to abut the surface of each container in a group of containers at the sides of the circular portions whereby the containers will be pushed into central alignment between said opposed members, said opposed members being mounted for opposed lateral movement with respect to the conveyor and path of movement of the containers, centering means associated with said opposed members for maintaining the members in bilateral symmetry with respect to a central alignment during lateral movements of said members, yieldable means for urging said members relatively toward each other, said yieldable means being sufficiently yieldable to allow the members to be moved relatively apart on movement of the container into indexing position by said conveyor, latch means associated with said members for holding the members in an adjusted lateral location during positioning of the containers being indexed, means for releasing said latch means and allowing said opposed members to move laterally an amount sufficient to allow the containers being indexed to pass through the indexing device, means for holding back additional containers during the indexing of said group of containers and preventing said additional containers from entering the indexing station during indexing and preventing unindexed containers from moving through the indexing station during the period of time that the indexed containers are leaving the indexing station, means for holding said opposed members in open position as each of the containers in the group of containers being indexed leaves the indexing position to prevent operation of the latch prior to the passage of the last container from the indexing station, and control means including a sensing element for operating a stop means between an open and closed position in the desired synchronization to allow the desired group of containers to pass into and out of the indexing station in timed relation.

16. The indexing device for indexing a group of containers and the like as defined in claim 15, in which the indexing device is operatively combined with an apparatus for performing an operation on each of the containers being indexed with the operation of said apparatus being synchronized in timed fashion with the indexing step of the indexing device so that the operation takes place during the time period that the containers are accurately positioned.

17. An indexing device for indexing bottles and the like having a spotting lug on a side wall thereof to provide an accurate position of the bottle in combination with a fixed rotational position, comprising positioning means carrying a pair of opposed members adapted to abut the surface of the container in two lateral locations on the circular portion thereof whereby the container will be pushed into central alignment between said members, said opposed members being mounted for lateral movement, yieldable means for urging said members relatively toward each other, said yieldable means being sufficiently yieldable to allow the members to be moved relatively apart on movement of a container into indexing position by said conveyor, centering means associated with said opposed members for maintaining the members in bilateral symmetry with respect to a central alignment during lateral movement of said members, latch means associated with said members for holding the members in an adjusted lateral location during positioning of the unit being positioned, means for tilting the bottle as it is held in indexed position to impart rotation thereto, a stop arm resiliently held against the bottle in a position to engage the spotting lug whereby the rotational motion due to tilting will be stopped at the desired rotational position, and means for releasing said latch means and allowing said members to move laterally an amount sufficient to allow the container being indexed to pass through said indexing device.

References Cited

UNITED STATES PATENTS

| | | | |
|---|---|---|---|
| 2,781,119 | 2/1957 | Talbot et al. | 198—29 |
| 2,894,262 | 7/1959 | Schafroth | 198—29 X |
| 3,089,576 | 5/1963 | Saver et al. | 198—29 |
| 3,225,890 | 12/1965 | Wiese | 198—29 |

TRAVIS S. McGEHEE, *Primary Examiner.*

N. ABRAMS, *Assistant Examiner.*